(12) United States Patent
Jezek

(10) Patent No.: US 6,182,686 B1
(45) Date of Patent: Feb. 6, 2001

(54) FOOT VALVE SAFETY COVER APPARATUS

(75) Inventor: Paul D. Jezek, Houston, TX (US)

(73) Assignee: Jetstream of Houston, Inc., Houston, TX (US)

( * ) Notice: Under 35 U.S.C. 154(b), the term of this patent shall be extended for 0 days.

(21) Appl. No.: 09/309,959

(22) Filed: May 11, 1999

(51) Int. Cl.[7] .............................. F16K 31/62; G05G 1/14
(52) U.S. Cl. ........................ 137/377; 251/295; 74/512; 74/561
(58) Field of Search .................... 251/295; 137/377; 74/512, 560, 561, 608, 612

(56) References Cited

U.S. PATENT DOCUMENTS

| | | | |
|---|---|---|---|
| 3,759,115 | * | 9/1973 | Dibonaventura et al. ............. 74/512 |
| 3,785,222 | * | 1/1974 | Dawson .................................. 74/561 |
| 3,916,722 | * | 11/1975 | Grobe .................................... 74/512 |
| 5,423,348 | * | 6/1995 | Jezek et al. ...................... 251/295 X |

* cited by examiner

Primary Examiner—John Rivell
(74) Attorney, Agent, or Firm—Kenneth A. Roddy

(57) ABSTRACT

A safety cover for foot valves has a base plate for supporting a valve body and a foot pedal cover portion including a front wall and laterally opposed side walls extending upwardly from the base plate and a top wall extending between upper ends thereof. The front wall has an aperture through which the foot lever of the valve extends and laterally opposed side extensions having a vertical portion extending outward from respective lateral sides of the front wall and a forwardly extending horizontal top portion at the upper end thereof spaced a distance above the base plate. A valve body having a fluid inlet, a fluid outlet, and a valve element therein connected with a foot lever extending outwardly from the body is secured into the base plate with its foot lever extending through the aperture in the front wall of the cover. The front, top and side walls of the cover partially surround the foot receiving portion of the foot lever and protect the foot of the operator from injury in the event of a failure. The laterally opposed side extensions partially surround hose and lance fittings that are connected with and extend outwardly from the valve body and protect the upper body of the operator from injury in the event of a failure, and also protect the fittings from damage by the foot of the operator.

11 Claims, 4 Drawing Sheets

FOOT VALVE SAFETY COVER APPARATUS

BACKGROUND OF THE INVENTION

1. Field of the Invention

This invention relates generally to safety enclosures and foot valves, and more particularly to a foot valve safety cover apparatus that protects the foot and upper body of the operator from injury in the event of a failure.

2. Brief Description of the Prior Art

In the waterblast industry high-pressure fluids are conducted through a valve and spray gun or cleaning lance for directing a high-pressure blast of fluid, such as water, against various surfaces such as concrete, metal, and the inside of tubes and vessels to clean unwanted deposits therefrom. Typically the fluid stream employed has a pressure in the range of from about 5,000–40,000 psi.

Foot-operated valves are commonly used in tube cleaning operations where the operator must manipulate the cleaning lance by hand. Typically, the foot valve consists of a base, a valve (typically mounted to the base), a pedal for operating the valve, and a pedal guard.

The primary function of prior art foot pedal guards is to merely protect the pedal from accidental contact by foreign objects, much like the trigger guard of a firearm. Most prior art pedal guards are from round bar, tubing, or sheet metal bent into a generally U-shaped configuration.

Although these types of pedal guards protect the foot pedal from accidental contact by foreign objects, they do not protect the operator in the event of a valve, lance, fitting or hose failure. Thus, even though a pedal guard may cover the foot valve, the operator is still exposed to injury from flying valve or lance components, hoses, fittings, and high-pressure fluid streams in the event of a failure. The prior art pedal guards are also not effective in protecting the lance, hose and fittings of a high-pressure valve from accidental breakage from the foot of the operator.

A typical foot valve and a U-shaped skeletal enclosure formed of tubing of the type used in the waterblast industry is shown and described with reference to FIG. 4 in U.S. Pat. No. 5,423,348 commonly owned with this application and hereby incorporated herein by reference.

U.S. Pat. No. 4,496,811 discloses a box-like safety enclosure having an open top and four upstanding side walls for enclosing the sides of a foot switch to prevent accidental actuation of the switch. One of the upstanding walls of the enclosure is pivotally movable against the urging of a closure spring to a lowered position the enable the foot of the operator to engage the switch.

The present invention is distinguished over the prior art in general, and these patents in particular by a safety cover for foot valves that has a base plate for supporting a valve body and a foot pedal cover portion including a front wall and laterally opposed side walls extending upwardly from the base plate and a top wall extending between upper ends thereof. The front wall has an aperture through which the foot lever of the valve extends and laterally opposed side extensions having a vertical portion extending outward from respective lateral sides of the front wall and a forwardly extending horizontal top portion at the upper end thereof spaced a distance above the base plate. A valve body having a fluid inlet, a fluid outlet, and a valve element therein connected with a foot lever extending outwardly from the body is secured into the base plate with its foot lever extending through the aperture in the front wall of the cover. The front, top and side walls of the cover partially surround the foot receiving portion of the foot lever and protect the foot of the operator from injury in the event of a failure. The laterally opposed side extensions partially surround hose and lance fittings that are connected with and extend outwardly from the valve body and protect the upper body of the operator from injury in the event of a failure, and also protect the fittings from damage by the foot of the operator.

SUMMARY OF THE INVENTION

It is therefore an object of the present invention to provide a foot valve cover that will effectively protect the operator from injury from flying valve components, hose fittings and lance fittings, and high-pressure fluid streams in the event of a failure.

It is another object of this invention to provide a foot valve cover having a plate between the high-pressure valve and the foot pedal that will shield the foot of the operator from high-pressure fluid streams in the event of a failure.

Another object of this invention is to provide a foot valve cover having an upper plate extending over the high-pressure hose and lance fittings that will shield the upper body of the operator in the event of a failure.

Another object of this invention is to provide a foot valve cover that will protect lance, hose and fittings of a high-pressure valve from accidental breakage from the foot of the operator.

Another object of this invention is to provide a foot valve cover that is stable and cannot be easily tipped over accidentally.

A further object of this invention is to provide a foot valve cover that is simple in construction, inexpensive to manufacture, and rugged and reliable in operation.

A still further object of this invention is to provide a foot operated valve having a safety cover that partially encloses the foot receiving end of its foot lever to protect the foot of the operator from injury and laterally opposed side extensions that partially surround hose and lance fittings extending outwardly from the valve body to protect the upper body of the operator from injury in the event of a failure.

Other objects of the invention will become apparent from time to time throughout the specification and claims as hereinafter related.

The above noted objects and other objects of the invention are accomplished by a safety cover for foot valves that has a base plate for supporting a valve body and a foot pedal cover portion including a front wall and laterally opposed side walls extending upwardly from the base plate and a top wall extending between upper ends thereof. The front wall has an aperture through which the foot lever of the valve extends and laterally opposed side extensions having a vertical portion extending outward from respective lateral sides of the front wall and a forwardly extending horizontal top portion at the upper end thereof spaced a distance above the base plate. A valve body having a fluid inlet, a fluid outlet, and a valve element therein connected with a foot lever extending outwardly from the body is secured into the base plate with its foot lever extending through the aperture in the front wall of the cover. The front, top and side walls of the cover partially surround the foot receiving portion of the foot lever and protect the foot of the operator from injury in the event of a failure. The laterally opposed side extensions partially surround hose and lance fittings that are connected with and extend outwardly from the valve body and protect the upper body of the operator from injury in the event of a failure, and also protect the fittings from damage by the foot of the operator.

DESCRIPTION OF THE PREFERRED EMBODIMENT

Figure 1:
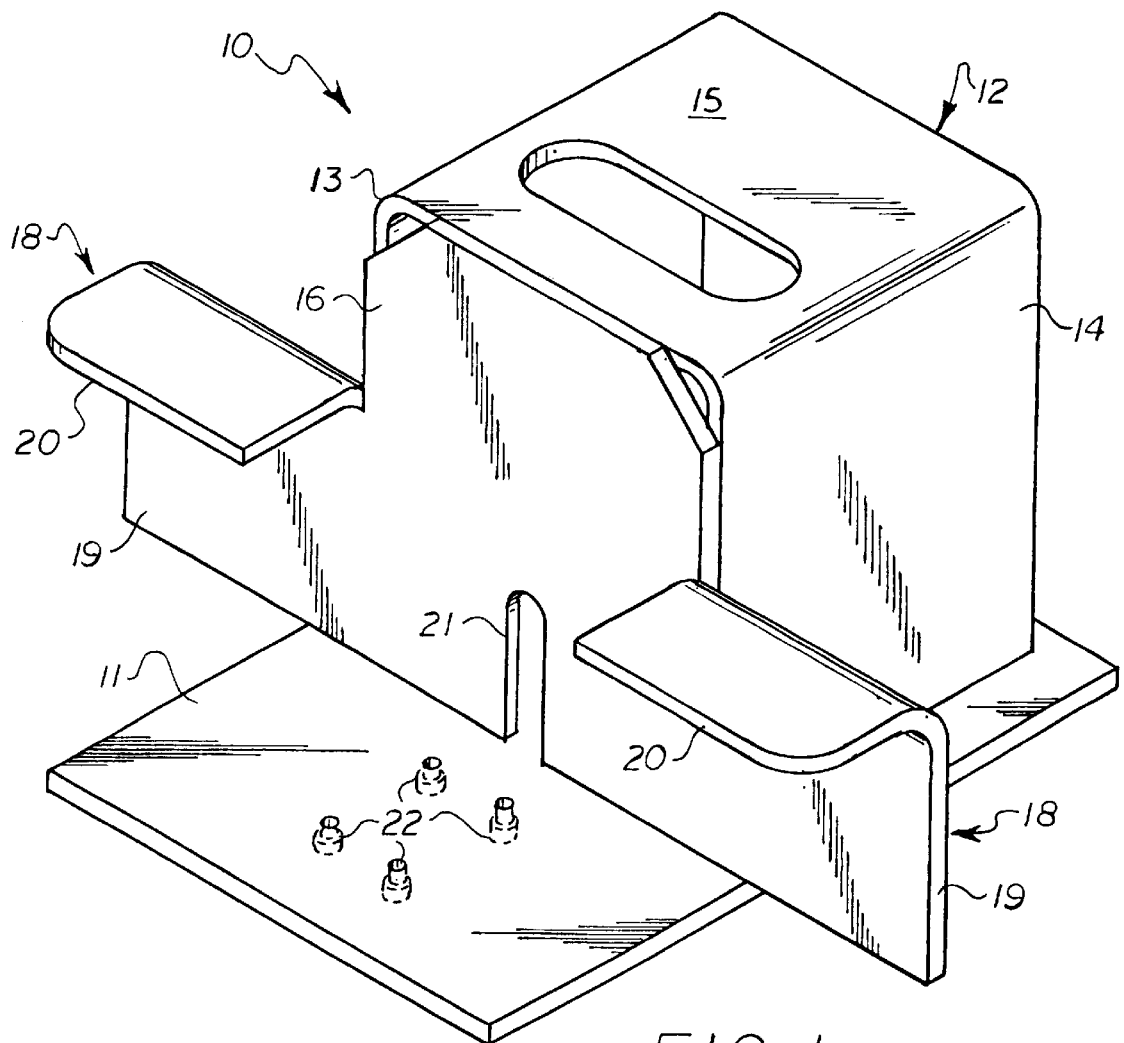
FIG. 1 is an isometric view of a foot valve cover in accordance with the present invention shown from the front.
Figure 2:
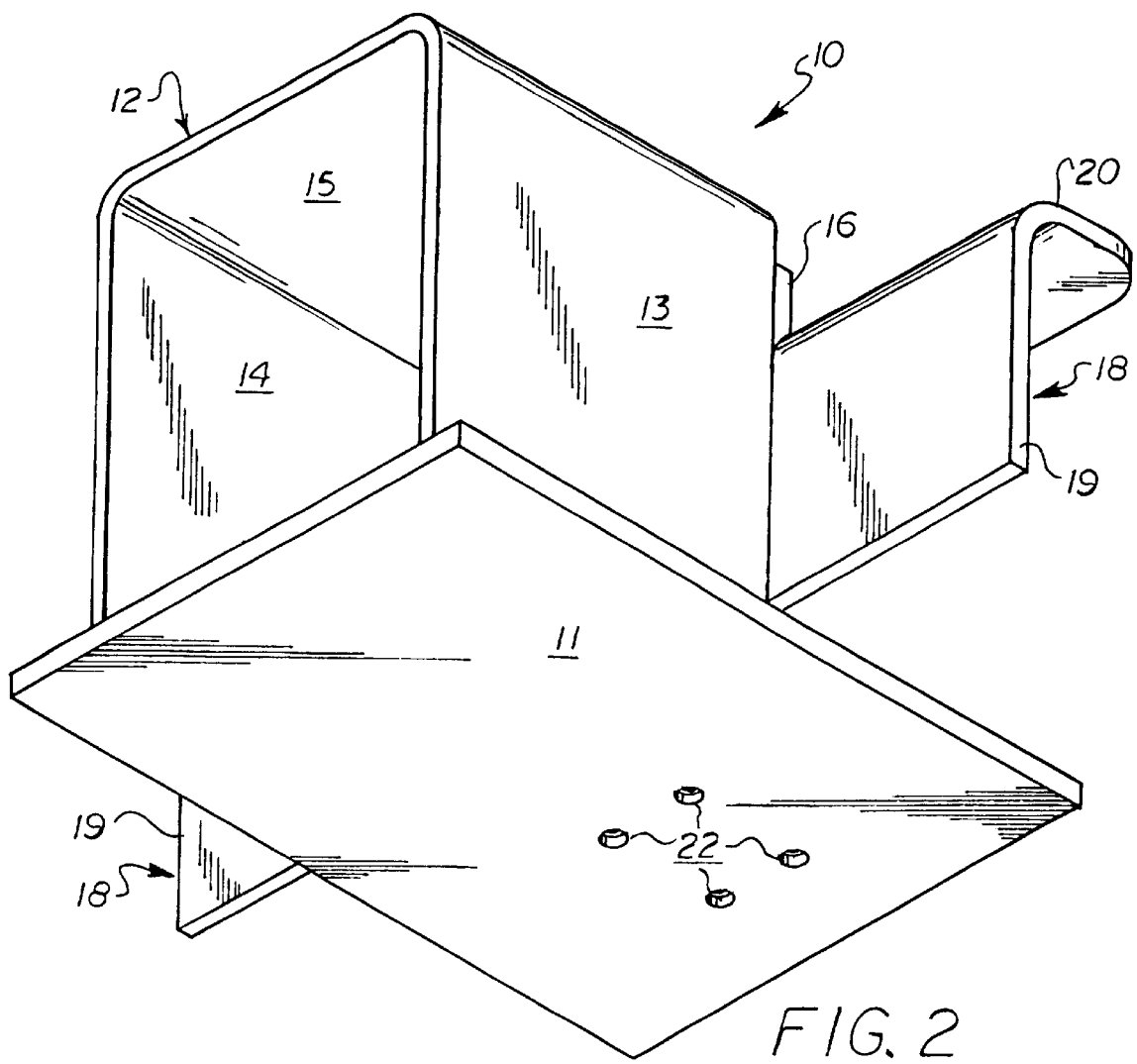
FIG. 2 is an isometric view of a foot valve cover in accordance with the present invention shown from the rear.

Referring to the drawings by numerals of reference, there is shown in FIG. 1, a preferred foot valve cover 10 in accordance with the present invention. The cover 10 is preferably constructed of metal plate bent and welded together to form a unitary structure. The cover has a rectangular base plate 11, an inverted generally U-shaped pedal guard portion 12 having laterally opposed side walls 13 and 14 extending upwardly from laterally opposed sides of the base plate and a top wall 15 extending over a rear portion of the base plate. The pedal guard portion 12 has an open back end and a vertical wall 16 at its front end.

The top wall 15 may be provided with an aperture 17 for receiving the fingers of the hand of a user for lifting and transporting the unit. It should be understood that other handle means may be provided on the top wall 15 to be grasped by the hand of a user for lifting and transporting the unit.

The vertical wall 16 has a pair of side extensions 18 that extend laterally outward a distance beyond the side walls 13 and 14 of the pedal guard portion 12. Each side extension 18 has a vertical portion 19 with an upper end 20 that is bent over to extend horizontally forward a distance above the base plate 11. A central vertical slot 21 formed in the vertical wall 16 is disposed between the inner facing sides of the side walls 13 and 14 extends a distance upwardly from the base plate 11.

The front portion of the base plate 11 may be provided with counterbored holes 22 extending upwardly from its underside for bolting the valve body 23 of a foot valve 24 onto the top surface of the base plate. It should be understood that the foot valve 24 may also be secured to the base plate 11 by other conventional means.

Figure 3:
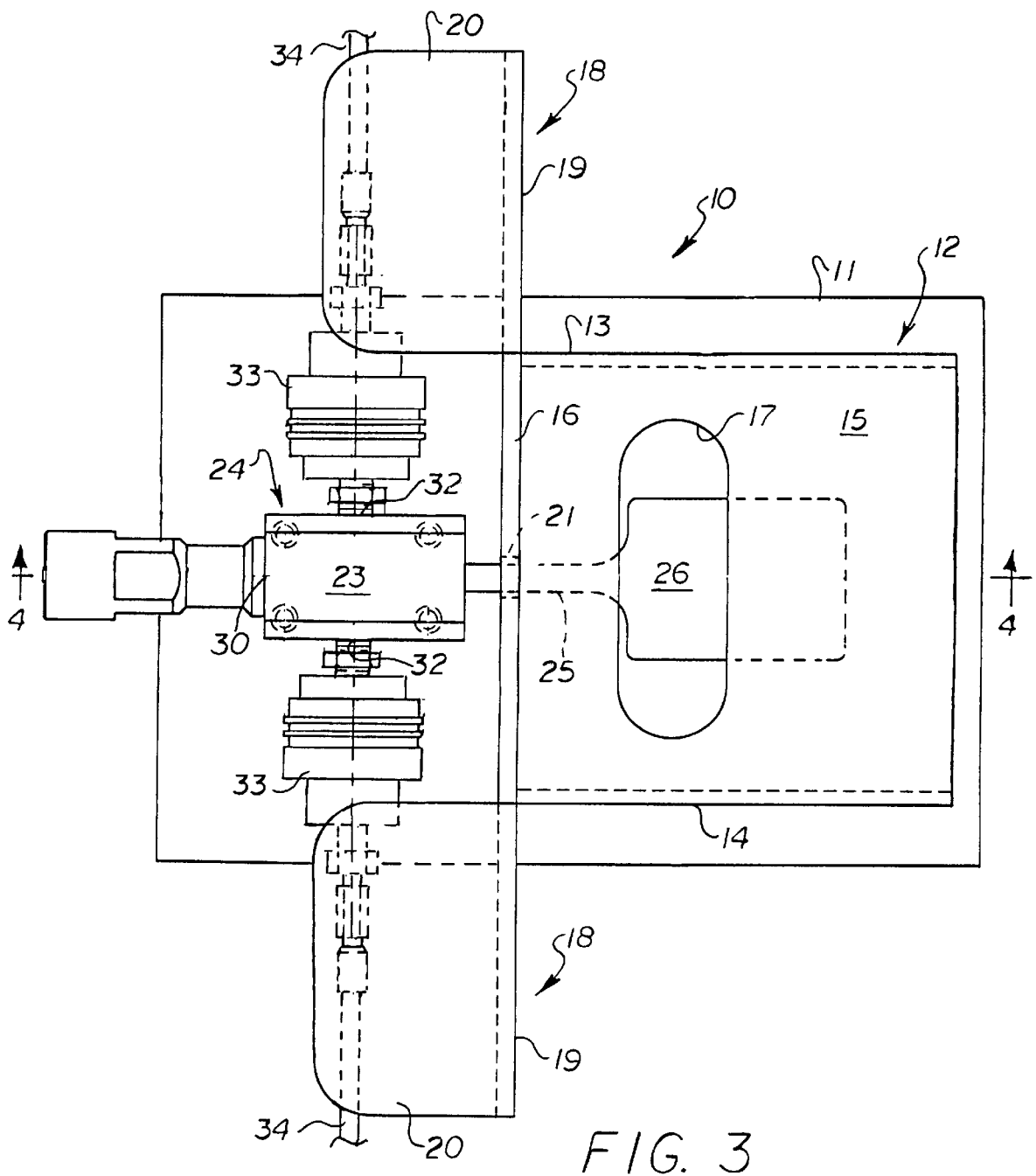
FIG. 3 is a top plan view of the foot valve cover with a foot valve secured to the base plate.
Figure 4:
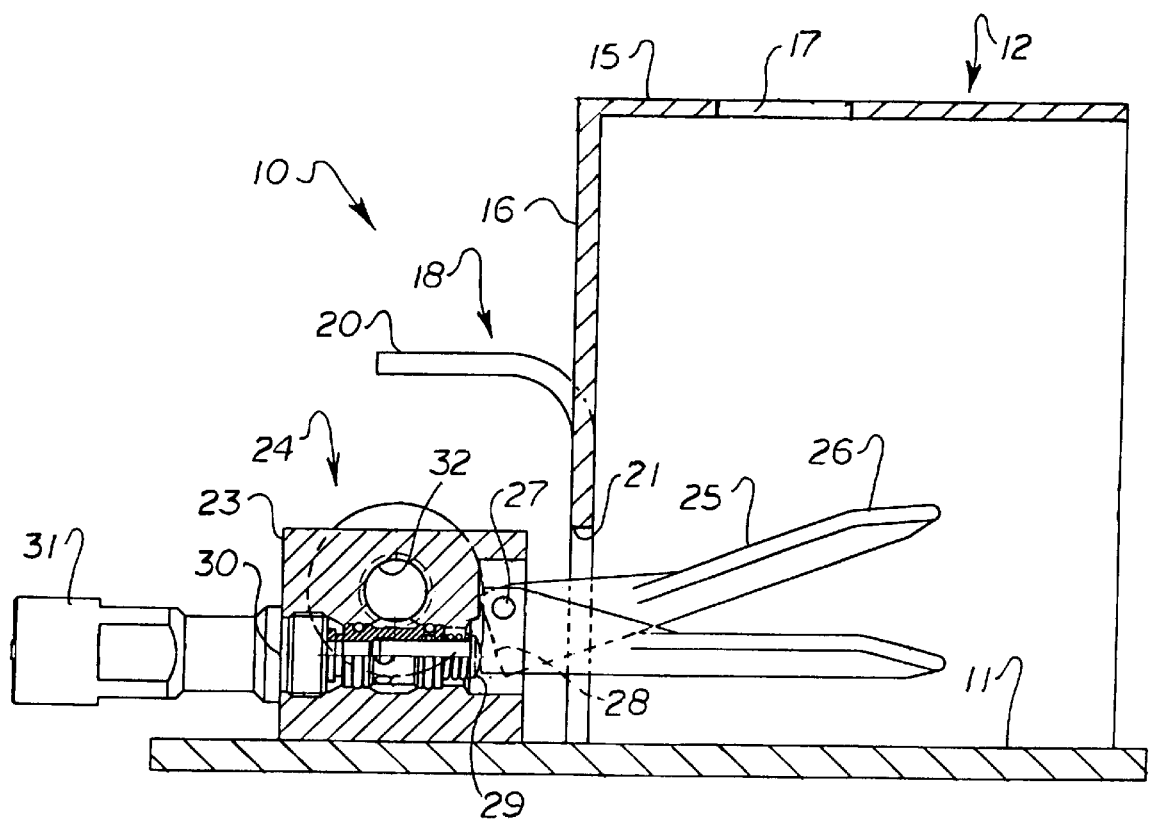
FIG. 4 is a cross section through the foot valve cover and foot valve taken along line 4—4 of FIG. 3.

FIGS. 3 and 4 show a typical foot valve 24 secured to the front portion of the base plate 11. The foot valve 24 shown in the drawings is for purposes of illustration, and it should be understood that foot valves of various other configurations may be used. Another foot valve suitable for use is disclosed in U.S. Pat. No. 5,423,348, commonly owned with this application and hereby incorporated herein by reference.

The foot valve 24 has an actuating lever or foot pedal 25 that extends through the vertical slot 21 in the vertical wall 16 with its outer foot receiving end 26 surrounded by the side walls 13 and 14 and top wall 15 of the U-shaped pedal guard portion 12. The inner end of the foot pedal 25 is pivotally connected to the valve body 23 by a pin 27 and has a tang portion 28 that engages the head of a valve closure element 29 of the valve assembly.

The typical foot valve body 23 has an inlet port 30 into which a hose fitting 31 is secured that is connected by a hose with a source of fluid under pressure, and a one or more fluid outlet ports 32 on either side into which a lance hose fitting 33 is secured that is connected by high-pressure hose or tubing 34 to a spray gun or cleaning lance (not shown).

As shown in FIGS. 3 and 4, the foot receiving end 26 of the actuating lever or foot pedal 25 of the foot valve 24 is disposed within the side walls 13 and 14 and top wall 15 of the U-shaped pedal guard portion 12, and the front wall 16 of the pedal guard portion is disposed between the high-pressure valve 24 and the foot receiving end 26 of the foot pedal 25 to shield the foot of the operator from flying valve components, lance fittings, hose fittings, and high-pressure fluid streams in the event of a failure. The vertical portion 19 of the side extensions 18 and their upper ends 20 partially cover the laterally extending high-pressure hose and lance fittings 33 and shield the upper body of the operator in the event of a failure. The side extensions 19 also protect the high-pressure lance and hose fittings from accidental breakage from the foot of the operator.

While this invention has been described fully and completely with special emphasis upon a preferred embodiment, it should be understood that within the scope of the appended claims the invention may be practiced otherwise than as specifically described herein.

What is claimed is:

1. A safety cover for foot valves for protecting the operator from injury, comprising:

a base plate for supporting a valve body;

a foot pedal cover portion including a front wall and laterally opposed side walls extending upwardly from said base plate and a top wall extending between upper ends there for partially surrounding a foot receiving portion of a foot lever that extends outwardly from the valve body; and laterally opposed fitting cover portions, each having a vertical wall extending outward from respective lateral sides of said front wall, and a forwardly extending top wall at the upper end thereof spaced a distance above said base plate for partially surrounding hose and lance fittings that are connected with and extend outwardly from the valve body.

2. The safety cover according to claim 1, wherein said front wall is disposed between the valve body and the foot receiving portion and has an aperture through which the foot lever extends.

3. The safety cover according to claim 1, wherein said base plate and said foot pedal cover portion are formed of metal plate.

4. The safety cover according to claim 1, wherein said fitting cover portions are formed of metal plate.

5. The safety cover according to claim 1, further comprising:

apertures through said base plate for receiving fasteners to secure the valve body thereon.

6. The safety cover according to claim 1, further comprising:

handle means on said safety cover for manually lifting and transporting said safety cover.

7. A foot valve, comprising:

a valve body having a fluid inlet, a fluid outlet, a valve element therein operatively connected with a pivotal foot lever extending outwardly from said body and having a foot receiving portion at an outer end;

a safety cover including a base plate secured to said valve body and a foot pedal cover portion having a front wall, laterally opposed side walls extending upwardly from said base plate, and a top wall extending between upper ends thereof for partially surrounding said foot receiving portion of said foot lever; and laterally opposed fitting cover portions, each having a vertical wall extending outward from respective lateral sides of said front wall, and a forwardly extending top wall at the upper end thereof spaced a distance above said base plate for partially surrounding hose and lance fittings that are connected with and extend outwardly from said valve body.

8. The foot valve according to claim 7, wherein said front wall is disposed between said valve body and said foot receiving portion and has an aperture through which said foot lever extends.

9. The foot valve according to claim 7, wherein said base plate and said foot pedal cover portion are formed of metal plate.

10. The foot valve according to claim 7, wherein said fitting cover portions are formed of metal plate.

11. The foot valve according to claim 7, further comprising:

handle means on said safety cover for manually lifting and transporting said foot valve.

* * * * *